United States Patent [19]

Callen et al.

[11] Patent Number: 4,494,063
[45] Date of Patent: Jan. 15, 1985

[54] SATELLITE DUAL BUS POWER SYSTEM

[75] Inventors: Patrick J. Callen, Yardley, Pa.; Philip R. Pierce, Point Pleasant Beach, N.J.

[73] Assignee: RCA Corporation, New York, N.Y.

[21] Appl. No.: 452,773

[22] Filed: Dec. 23, 1982

[51] Int. Cl.³ .............................................. H02J 7/00
[52] U.S. Cl. ...................................... 320/56; 320/39; 307/29; 307/38; 307/66
[58] Field of Search ................. 320/2, 39, 56; 307/18, 307/29, 38, 43, 52, 53, 55, 58, 64, 66

[56] References Cited

U.S. PATENT DOCUMENTS

| | | | |
|---|---|---|---|
| 3,419,779 | 12/1968 | Zehner | 320/40 |
| 3,755,686 | 8/1973 | Woods | 307/29 |
| 4,010,412 | 3/1977 | Forman . | |
| 4,177,388 | 12/1979 | Lingenfelter . | |
| 4,189,776 | 2/1980 | Kendall . | |
| 4,313,078 | 1/1982 | Bilsky et al. . | |

OTHER PUBLICATIONS

Conference: "Energy to the 21st Century" Proceedings of the 15th Intersociety Energy Conversion Engineering Conference, Electrical Power System for the SBS Communications Satellite, Michael W. Miller, Aug. 1980.

Primary Examiner—William M. Shoop
Assistant Examiner—Anita M. Ault
Attorney, Agent, or Firm—J. S. Tripoli; R. L. Troike; R. E. Smiley

[57] ABSTRACT

In a satellite power distribution system such as for use in a communications satellite, a first load powering power distribution bus receives power from a first solar panel. A second load powering power distribution bus receives power from a second solar panel. One of the buses is connected to a battery system to provide power to loads during night periods. The loads connected to the other bus are not powered during the night periods.

5 Claims, 1 Drawing Figure

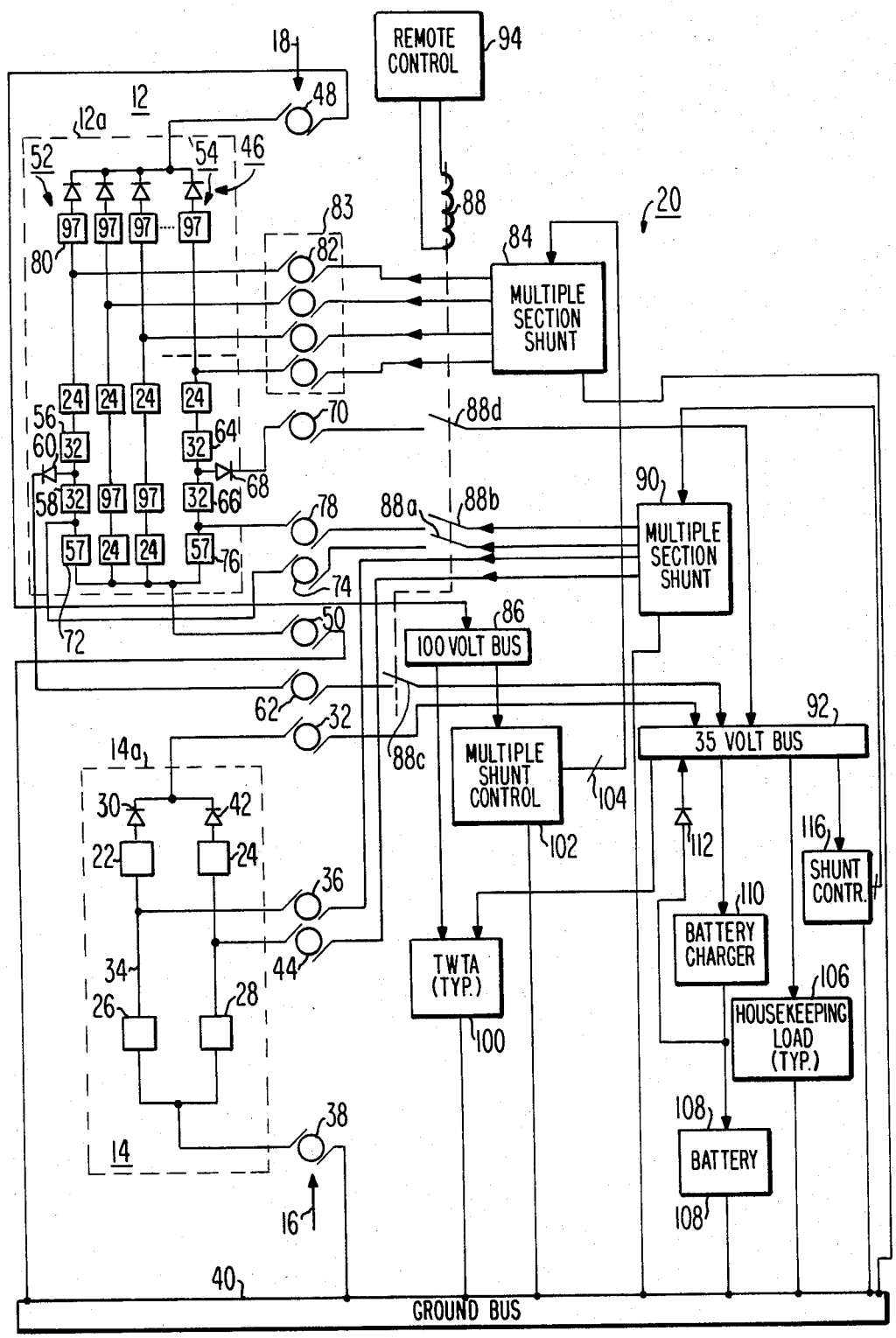

SATELLITE DUAL BUS POWER SYSTEM

This invention relates to solar powered satellite power distribution systems and more particularly, to such systems involving dual power sources.

BACKGROUND OF INVENTION

In prior art communication satellites, functionally a single power bus has been used to power all on board loads including communications amplifiers and so called "housekeeping" loads, such as the attitude control, command, telemetry and thermal, and power subsystems. The bus receives power during daylight hours from a solar array producing typically between 23 and 36 volts. There are actually typically two arrays, one on either side of the satellite, but both are connected to the bus so that functionally the arrangement can be treated as one array. A battery and battery charger are connected in series between the bus and spacecraft ground. The battery is charged during the day and produces power to power spacecraft loads at night. Some spacecraft loads, particularly amplifiers, in the interest of higher efficiency and reduced weight require more voltage than 23 to 36 volts and tighter tolerances, 100 volts ±2 volts being exemplary. The prior art system typically employs voltage boosters and voltage regulators to provide the elevated tighter tolerance voltage. To avoid the possibility of malfunction due to failure, typically the battery, battery charger, voltage regulator and voltage booster are all duplicated. Such voltage boosters, voltage regulators, batteries and battery chargers are costly in terms of weight, volume and money. One might consider utilizing a 100 volt bus to replace the 35 volt bus. This would require the use of 100 volt batteries, however, which are not practical.

In the space orbit used by communications satellites, there are only two periods of 44 days each in which the satellite is not illuminated for 24 hours. On these two 44 day periods the satellite is not illuminated for times ranging from two minutes to 72 minutes. In certain satellite systems not all loads are required to be powered during the night periods. Particularly the communications amplifiers which require the tightest tolerance, highest voltage and most current, do not need to be operated at night.

SUMMARY OF THE INVENTION

In accordance with a preferred embodiment of the present invention, a satellite power distribution system comprises in combination first and second means for producing an electrical energy of first and second values respectively in response to the application of solar energy thereto, which solar energy is not always available. First and second voltage distribution means coupled respectively to the first and second means for producing electrical energy, and electrical energy storage means coupled to one of the distribution means for receiving electrical energy from its associated electrical energy producing means when the solar energy is present and for providing electrical energy to the distribution means to which it is coupled when the solar energy is not present.

In the drawing:

The sole FIGURE is a schematic and block diagram representation of a satellite dual bus electrical distribution system in accordance with a preferred embodiment of the present invention.

DETAILED DESCRIPTION OF A PREFERRED EMBODIMENT

Referring to the sole FIGURE, a communications satellite electrical distribution system comprises first and second solar panels 12 and 14 within dashed blocks 12a and 14a respectively coupled through a plurality of slip rings arranged in a line between arrows 16 and 18 to the remainder 20 of the power distribution system illustrated to the right of arrows 16-18. In a satellite of the type utilizing the invention, in practice there are typically eight separate solar panels, four on one side of the satellite and four on the other side but the two illustrated solar arrays serve to functionally illustrate the invention.

Array 12 nominally produces 100 volts while array 14 nominally produces 35 volts given the presence of the sun (not shown). Each array is comprised of a large plurality of solar cells arranged in parallel and serial fashion. Each block within arrays 12 and 14 represents a plurality of solar cells. By way of example, each of blocks 22 and 24 in array 14 may represent 17 columns of solar cells connected in parallel where each column comprises 32 cells connected in series. Blocks 26 and 28 may each represent 17 columns of solar cells connected in parallel, where each column comprises 57 solar cells in series. Each solar cell may typically be of the type sold by Applied Solar Energy Corp., Los Angeles, Cal., and capable of producing 0.49 volts at 0.3 amps at 28° C. and air mass 0.

One end of all the columns of solar cells represented by block 22 are connected via diode 30 to slip ring 32. The other end of the columns are connected via conductor 34 to one end of all the columns of solar cells represented by block 26 and to slip ring 36. The other end of all the columns of solar cells represented by block 26 are connected via slip ring 38 to systems ground bus 40. Groups of solar cells represented by blocks 24 and 28 are connected in a similar manner to the interconnection of the solar cells represented by blocks 22 and 26. That is, the solar cells in blocks 24 and 28 are series connected between ground bus 40 and slip ring 32 via diode 42. Also the juncture of solar cells in blocks 24 and 28 are connected to slip ring 44.

The general interconnection of solar cells in array 12 is similar to that in array 14. Differences are in the details of each block and the number of blocks. For example, there are seven parallel groups, not two, four of the seven being illustrated within array 12. Each of the blocks represents eleven columns (not seventeen) arranged in parallel. All of the seven parallel groups of solar cells are connected via diodes 46 to slip ring 48. All of the seven groups are connected at the other end via slip ring 50 to ground bus 40.

For reasons which will be described hereinafter, two of the seven groups differ slightly in physical arrangement from the other five groups. These groups are the leftmost and rightmost groups of panel 12 and legended 52 and 54 respectively. These two groups 52 and 54 consist of five blocks of solar cells whereas the other five groups consist of four blocks of solar cells. The numbers within the various blocks in array 12 represent, by way of example, the number of solar cells connected in series in each of the eleven columns of solar cells.

The juncture of blocks 56 and 58 of solar cells are connected by diode 60 to slip ring 62. Similarly, the juncture between blocks 64 and 66 is connected via diode 68 to slip ring 70. The juncture between blocks 58 and 72 are connected to slip ring 74 while the juncture between blocks 66 and 76 are connected to slip ring 78. The upper blocks such as 80 of each of the groups of solar cells is connected to a different slip ring such as 82 within dashed box 83. The slip rings such as 82 are each connected to a multiple section shunt 84.

Slip ring 48 is connected to the satellite system 100 volt bus 86. Slip rings 74 and 78 are connected via relay contacts 88a and 88b to a multiple section shunt 90. Shunts 84 and 90 are of conventional design. Slip rings 62 and 70 are connected via relay contacts 88c and 88d to the system 35 volt bus 92. All relay contacts 88a, 88b, 88c and 88d are connected to a common relay coil 88 which is either energized or not energized by a remote control means illustrated generally as a block 94. Block 94 as will be described hereinafter, is actually energized by signals transmitted from a ground station to the communications satellite. Slip ring 32 is connected to 35 volt systems bus 92 while slip rings 36 and 44 are connected to multiple section shunt 90.

One hundred volt bus 86 is connected to a plurality of loads, traveling wave tube amplifier (TWTA) 100 being exemplary of such a load. The traveling wave tube amplifier is part of the communications amplifier system. TWTA's such as 100 also typically receive heater current from the 35 volt bus 92. The TWTA extends between 100 volt bus 86 and ground bus 40. A multiple shunt control 102 of conventional design also extends between bus 86 and ground bus 40. A multiple conductor connection exists between shunt control 102 and multiple section shunt 84. Multiple conductor wires are indicated as such by means of a cross hatch mark such as 104.

The 35 volt bus 92 is also connected to a plurality of loads. A typical housekeeping load is illustrated by block 106. The loads to which the 35 volt bus are connected must be operational at all times including those periods of time during which the sun is not illuminating solar panels 12 and 14. The current required during periods of non-illumination is provided by a battery 108 kept charged during periods of illumination by a battery charger 110. Battery 108 and battery charger 110 may be as illustrated and described in U.S. Pat. No. 4,313,078 issued Jan. 26, 1982 to H. W. Bilsky and P. J. Callen. A diode 112 connects between the juncture of the battery charger 110 and battery 108 and 35 volt bus 92 such that when no sun is present, the charge in battery 108 is coupled to the 35 volt bus to provide power thereto.

As illustrated in the aforementioned patent, there are actually multiple batteries and multiple battery chargers but what is illustrated is functionally the way the interconnection is made. A shunt control 116 is connected between 35 volt bus 92 and multiple section shunt 90 by a multiple conductor to control the operation of multiple section shunt 90.

Operation of the power distribution system depends on whether the solar panels are fully deployed or whether the panels are not deployed. The panels are not deployed during transfer orbit. In the latter case, panel 12 is partially covered by panel 14. During transfer orbit, however, blocks 58, 72, 66 and 76 of solar cell panel 12 are illuminated by the sun. This is important for reasons which will be discussed hereinafter.

Although chronologically the panel non-deployment occurs first and the panel deployment occurs second, the operation of the latter case will be discussed first. With panels 12 and 14 deployed, relay contacts 88a, 88b, 88c and 88d are as shown in the FIGURE (i.e., open). Power generated by solar panel 14 is passed via slip ring 32 to 35 volt bus 92 and thereby to loads such as housekeeping load 106, the heaters of TWTA's 100 and battery charger 110. Power generated by solar panel 12 is passed via slip ring 48 to 100 volt bus 86 and thereby to loads attached thereto, such as TWTA 100. With fully working solar cells and full sun, the solar panels 12 and 14 actually produce more than 100 volts and 35 volts respectively and more current than is necessary. The purpose of shunt control 102 is to detect any departure from 100 volts±any allowed deviation at bus 86 and to control multiple section shunt 84 to shunt to ground current in one or more groups of solar cells in solar panel 12 to maintain the 100 volts on bus 85 under all load and solar panel conditions (assuming the presence of sun).

Similarly, shunt control 116 detects any departure from 35 volts±any allowed deviation therefrom and controls multiple sections shunt 90 to shunt to ground current from one or the other of solar cell sections 26 and 28 in panel 14.

During the 44 night periods twice a year, no power is generated by solar panel 12 and thus loads such as TWTA 100 receive no operating power (heater power is maintained on the TWTAs) from bus 92. No power is generated by solar panel 14 either but battery 108 supplies power to bus 92 during such periods of darkness.

During transfer orbit when the solar panels are not deployed, it is not possible to have both solar panels 12 and 14 receptive of sun power. Further, although the satellite does not need 100 volts during transfer orbit (the TWTA amplifiers are not operational), panel 14 is not capable of producing sufficient 35 volt power to operate the satellite. Therefore, during transfer orbit prior to solar panel deployment, relay coil 88 is energized by remote control device 94 from earth signals to close all contacts 88a, 88b, 88c and 88d. Then solar cell sections 58 and 72, 66 and 76 via respective slip rings 62 and 70 and respective relay contacts 88c and 88d supply power to 35 volt bus 92 along with power supplied by panel 14. Again, as with the fully deployed solar panel situation, the solar cells may typically produce more than 35 volts. Therefore, shunt control 116 controls multiple section shunt 90 as required to shunt to ground current from solar cell section 72 and/or section 76 to maintain proper voltage on bus 92.

It will be understood that the particular voltages such as 100 volts and 35 volts and numbers of solar panels and solar cells in each panel and the arrangement thereof, is only by way of example and not intended to limit the scope of the invention.

It is possible that during normal operation, that is, when both solar panels are fully deployed, that some defect may occur to solar panel 14 such as to put it out of operation on a temporary or permanent basis. In such a situation, it is still mandatory that voltage be available on the 35 volt bus. In such a situation as when the solar panels were not deployed, relay coil 88 is energized as described above and solar panel 12 supplies power to 35 volt bus 92 to keep it operational at all times. In such a situation, less power would be available to the 100 volt bus 92, which means that fewer TWTA's and other 100 volt loads could be operated but the satellite would be capable of continued operation albeit with reduced communications capabilities.

What is claimed is:

1. A satellite power distribution system, comprising, in combination:

first and second means, each for producing electrical energy in response to the application of solar energy thereto, which solar energy is not always present;

first and second power distribution means including separate first and second power distribution busses coupled respectively to said first and second means for producing electrical energy;

means for selectively coupling said first electrical energy producing means to said second power distribution means, said second power distribution means, when so coupled, receiving electrical energy from said first electrical energy producing means; and electrical energy storage means coupled to said second power distribution bus for receiving, when said solar energy is present, electrical energy from said second electrical energy producing means, and, when coupled to said first electrical energy producing means, for receiving energy from said first electrical energy producing means and for providing power to only said second distribution bus when said solar energy is not present.

2. The combination as set forth in claim 1 wherein first and second means for producing electrical energy comprise solar panels, each panel comprising a plurality of solar cells.

3. The combination as set forth in claim 2 wherein said first and second solar panels comprise means for producing different values of electrical energy.

4. A satellite power distribution system, comprising, in combination:

first and second means, each for producing electrical energy of first and second higher and lower values respectively in response to the application of solar energy thereto, which solar energy is not always present;

first and second power distribution means including separate first and second power distribution busses coupled respectively to said first and second means for producing electrical energy;

means for selectively coupling said first electrical energy producing means to said second power distribution means, said second power distribution means, when so coupled receiving electrical energy from said first electrical energy producing means; and electrical energy storage means coupled to said second power distribution bus for receiving, when said solar energy is present, electrical energy from said second electrical energy producing means, and, when coupled to said first electrical energy producing means, for receiving energy from said first electrical energy producing means and for providing power to only said second distribution bus when said solar energy is not present.

5. The combination as set forth in claim 4 wherein first and second means for producing electrical energy comprises solar panels, each panel comprising a plurality of solar cells.

* * * * *